(12) United States Patent
Lau et al.

(10) Patent No.: US 7,159,026 B2
(45) Date of Patent: Jan. 2, 2007

(54) SERVICE PERFORMANCE CORRELATION AND ANALYSIS

(75) Inventors: Richard C. Lau, Morganville, NJ (US); Frank C. D. Tsai, Morganville, NJ (US); Arturo Cisneros, Lincroft, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 739 days.

(21) Appl. No.: 10/062,904

(22) Filed: Jan. 31, 2002

(65) Prior Publication Data

US 2003/0145081 A1   Jul. 31, 2003

(51) Int. Cl.
| | |
|---|---|
| G06F 15/173 | (2006.01) |
| G01R 31/08 | (2006.01) |
| G08C 15/00 | (2006.01) |
| H04J 3/14 | (2006.01) |
| H04L 12/26 | (2006.01) |
| H04L 12/56 | (2006.01) |
| G06F 15/16 | (2006.01) |
| G06F 11/00 | (2006.01) |
| H04J 1/16 | (2006.01) |
| H04L 1/00 | (2006.01) |
| H04L 12/28 | (2006.01) |

(52) U.S. Cl. ............... 709/226; 709/223; 709/228; 709/235; 370/235; 370/395.21

(58) Field of Classification Search ........ 709/223–229, 709/235; 707/10; 370/235, 395.21
See application file for complete search history.

(56) References Cited

U.S. PATENT DOCUMENTS

| | | | | |
|---|---|---|---|---|
| 5,696,701 A | * | 12/1997 | Burgess et al. | 714/25 |
| 5,757,772 A | * | 5/1998 | Thornberg et al. | 370/236 |
| 5,787,253 A | * | 7/1998 | McCreery et al. | 709/231 |
| 5,796,633 A | * | 8/1998 | Burgess et al. | 702/187 |
| 5,905,868 A | * | 5/1999 | Baghai et al. | 709/224 |
| 6,148,337 A | * | 11/2000 | Estberg et al. | 709/224 |
| 6,292,485 B1 | * | 9/2001 | Trotta et al. | 370/389 |
| 6,377,550 B1 | * | 4/2002 | Prasad | 370/236.1 |
| 6,522,629 B1 | * | 2/2003 | Anderson, Sr. | 370/236 |
| 6,549,533 B1 | * | 4/2003 | Campbell | 370/351 |
| 6,577,642 B1 | * | 6/2003 | Fijolek et al. | 370/465 |
| 6,678,245 B1 | * | 1/2004 | Cooper et al. | 370/230 |
| 6,973,057 B1 | * | 12/2005 | Forslow | 370/328 |
| 2005/0068890 A1 | * | 3/2005 | Ellis et al. | 370/229 |
| 2005/0276218 A1 | * | 12/2005 | Ooghe et al. | 370/229 |

OTHER PUBLICATIONS

White, K. "Definitions of Managed Objects for Service Level Agreements Performance Monitoring," RFC 2758, Feb. 2000, pp. 1-71.*

J. Case, M. Fedor, M. Schoffstall, J. Davin, "A Simple Network Management Protocol (SNMP)," *RFC 1157*, University of Tennessee at Knoxville, Performance Systems International, and MIT Laboratory for Computer Science, May 1990.

* cited by examiner

*Primary Examiner*—Jason Cardone
*Assistant Examiner*—Melvin H. Pollack
(74) *Attorney, Agent, or Firm*—Philip J. Feig

(57) ABSTRACT

Methods and apparatus are provided to determine performance of a network. A first measurement relating to a first layer of communications in the network and a second measurement relating to a second layer of communications in the network are provided. Based on the first and second measurements, a set of parameters is generated. The performance of the network is then determined based on the generated set of parameters.

6 Claims, 2 Drawing Sheets

SERVICE PERFORMANCE CORRELATION AND ANALYSIS

FIELD OF THE INVENTION

The present invention relates to communication networks and, in particular, to methods and apparatus for determining performance of a network.

BACKGROUND OF THE INVENTION

Today, consumers are offered a variety of technologies for accessing the Internet, such as digital subscriber lines (DSL), cable, analog dial-up connections, integrated services digital network, etc. Typically, these technologies depend upon architectures which use multiple components and networks to access the Internet. For example, with DSL, a consumer connects to the Internet via a DSL modem, a DSL loop, an ATM access network, and a gateway device.

Current technologies for accessing the Internet often suffer from a variety of performance problems, including slow response, intermittent connections, and lost data. These performance problems are difficult to diagnose. Conventionally, these performance problems are diagnosed using tools and tests that measure a single parameter or analyze a single component. For example, a "ping" test is a common test used to diagnose network problems. In a ping test, a packet of data such as an Internet Protocol ("IP") packet is sent from a source to a specified IP address. A network device at the specified IP address then returns the IP packet to the source to indicate that it was successfully received. Hence, a ping test is typically used to determine whether a network can transport an IP packet.

Unfortunately, conventional tests, such as the ping test, do not provide all of the information needed to fully diagnose a performance problem. For example, a ping test only provides information related to IP communications in a network. A ping test does not provide information related to DSL or ATM performance of a network. In order to diagnose the DSL and ATM performance of a network, a user or technician is required to perform tests specifically designed for this purpose. Thus, the root cause of a performance problem may not be discovered until after conducting numerous tests over a period of time.

It is therefore desired to provide methods and apparatus that overcome the above and other shortcomings of the prior art.

SUMMARY OF THE INVENTION

Accordingly, methods and apparatus are provided to determine performance of a network. A first measurement relating to a first layer of communications in the network and a second measurement relating to a second layer of communications in the network are provided based on the first and second measurements. A set of performance parameters is generated. The network performance of the network may then be determined based on the generated set of parameters.

In one embodiment, the performance of the network may be determined based upon measurements relating to the transport of internet protocol packets in the network and an attainable bit rate in a portion of the network. The measurement relating to internet protocol packets may then be compared to the attainable bit rate measurement to generate a performance parameter. For example, the performance parameter may be based on whether the measurement relating to internet protocol packets are above a threshold percentage of the attainable bit rate.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

In the Figures.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
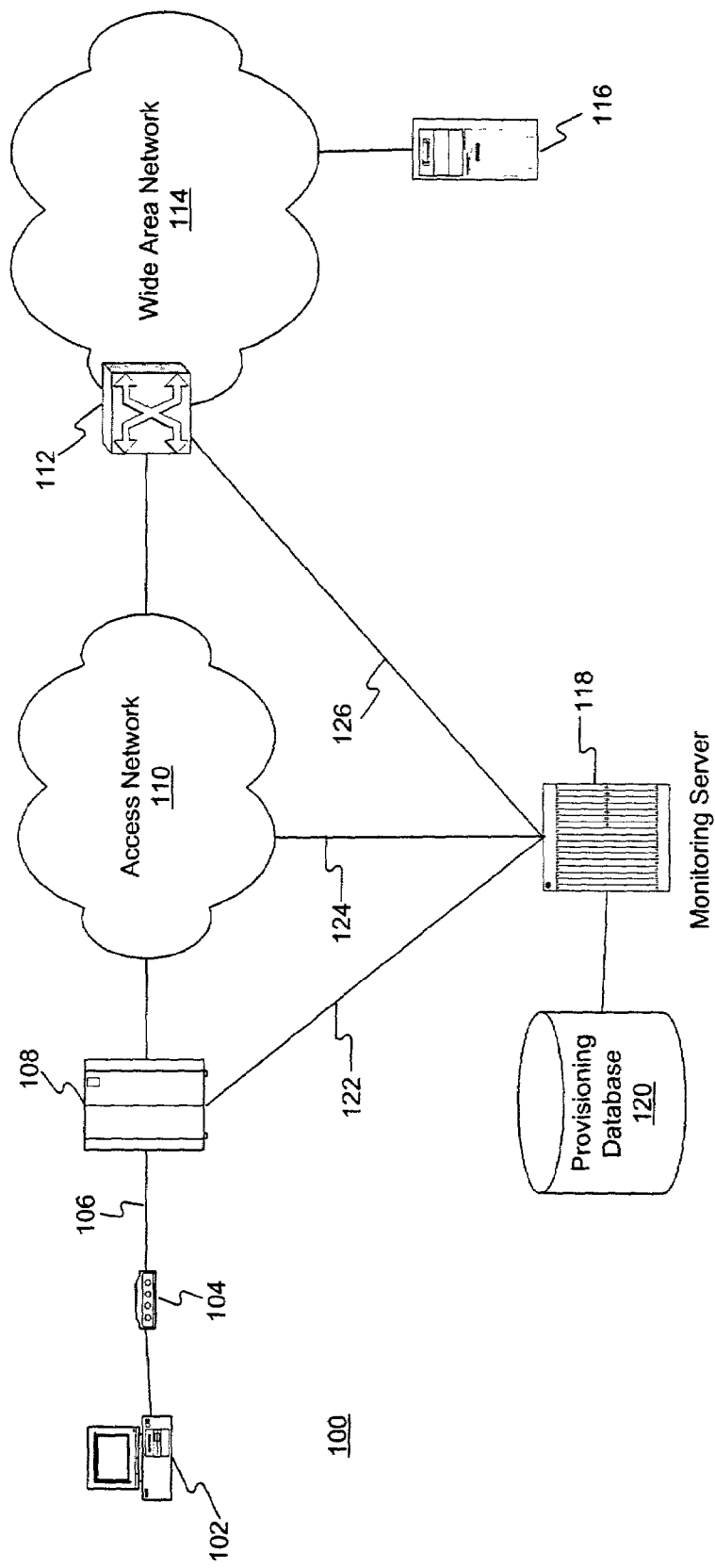
FIG. 1 illustrates a network, in accordance with methods and apparatus consistent with the present invention.

FIG. 1 illustrates a network 100, in accordance with methods and apparatus consistent with the principles of the present invention. As shown, network 100 comprises a user device 102, a network access device 104, an access link 106, an access multiplexer 108, an access network 110, a gateway device 112, a wide area network ("WAN") 114, a destination device 116, a monitoring server 118, and a database 120.

User device 102 may be any device capable of accessing a network, such as access network 110. User device 102 may include any one or more of a variety of known devices, such as a personal computer, laptop personal digital assistant, or a mobile phone.

Network access device 104 may provide a communications interface for user device 102. For example, network access device 104 may include a dial-up modem, a digital subscriber line ("DSL") modem, a wireless modem, or a cable modem. Although network access device 104 is shown as being separate from user device 102, network access device 104 may be integrated within user device 102. Alternatively, any number of network elements, such as a hub, router, firewall, or switch, may be interposed between user device 102 and network access device 104.

Access link 106 provides a physical link between network access device 106 and access multiplexer 108. Access link 106 may be based on wire-line technologies, such as, a telephone line, a DSL link, or a dedicated trunk, such as a T-1 trunk. Access link 106 may also be based on wireless technologies, such as, radio frequency (RF), satellite, and microwave.

Access multiplexer 108 may provide an access point for user device 102 to access network 110. For example, access multiplexer 108 may be implemented as a modem bank, a DSL access multiplexer, a wireless base station, etc. using known hardware and software. Although access multiplexer 108 is shown interfacing a single user device, access multiplexer 108 may provide an access point for a plurality of user devices.

Access network 110 may allow communications between user device 102 and wide area network 114. Access network 110 may be implemented over a range of distances, such as over a local area, a metropolitan area, or a wide area using any number of nodes (not shown). Access network 110 may be implemented using a variety of technologies, including Internet Protocol (IP), Asynchronous Transfer Mode (ATM), frame-relay, Ethernet, etc. For example, in one embodiment, access network 110 may be implemented using a plurality of ATM switches. Information communicated between user device 102 and wide area network 114 may pass through access network 110 over virtual connections, such as ATM permanent virtual circuits ("PVC").

Gateway device 112 may connect access network 110 and WAN 114 and may translate communications between access network 110 and WAN 114. For example, gateway device 112 may be a switch, such as an ATM switch that terminates a virtual connection traversing access network 110 and provides IP packets to and from WAN 114. Alternatively, gateway device 112 may comprise multiple devices coupled together, such as a switch connected to a router.

WAN 114 may be any type of wide area network, such as the Internet or a corporate intranet. Destination device 116 may provide information from, for example, an Internet web site to user device 102 via WAN 114. Destination device 116 may include a web server or an application server. Alternatively, destination device 116 may be including other types devices, such as a router or firewall.

Monitoring server 118 may provide operations support and monitoring for network 100, including configuration management, provisioning, testing, billing, monitoring, and other management functions. Monitoring server 118 may be implemented using known hardware and software, such as one or more general purpose computers. Monitoring server 118 may be connected via links 122, 124, and 126 to management ports on access multiplexer 108, access network 110, and gateway device 112, respectively. Links 122, 124, and 126 may be dedicated physical links, between monitoring server 118, multiplexer 108, access network 110, and gateway device 112. Alternatively, link 124 may be a physical link between monitoring server and access network 110, while links 122 and 126 may be implemented as logical links, such as virtual connections over access network 110. In addition, monitoring server 118 may be connected to other components of network 100, such as access device 104 and destination device 116.

Database 120 may store information relating to the configuration and provisioning of network 100, including information relating to products and services provided over access link 106, access multiplexer 108, and access network 110, such as service level agreements, equipment descriptions, wiring information, transmission information, and information related to the physical and logical topologies of access network 110. Database 120 may also store information relating to the configuration of access device 104, access link 106, access multiplexer 108, one or more nodes (not shown) within access network 110, and gateway device 112. For example, database 120 may store information, such as a data rate capacity of access link 106, virtual connection information including, for example, virtual path identifiers ("VPI") and virtual channel identifiers (VCI"), IP addresses of access device 104 and gateway device 112, an address of a management port on access multiplexer 108, addresses for one or more nodes within access network 110, and an address for gateway device 112. Database 120 may also store other data relating to operations support and monitoring of network 100, such as utilization statistics from access network 110. Although shown directly connected to monitoring server 118, database 120 may be integrated with monitoring server 118, or may be remotely connected to monitoring server 118.

Figure 2:
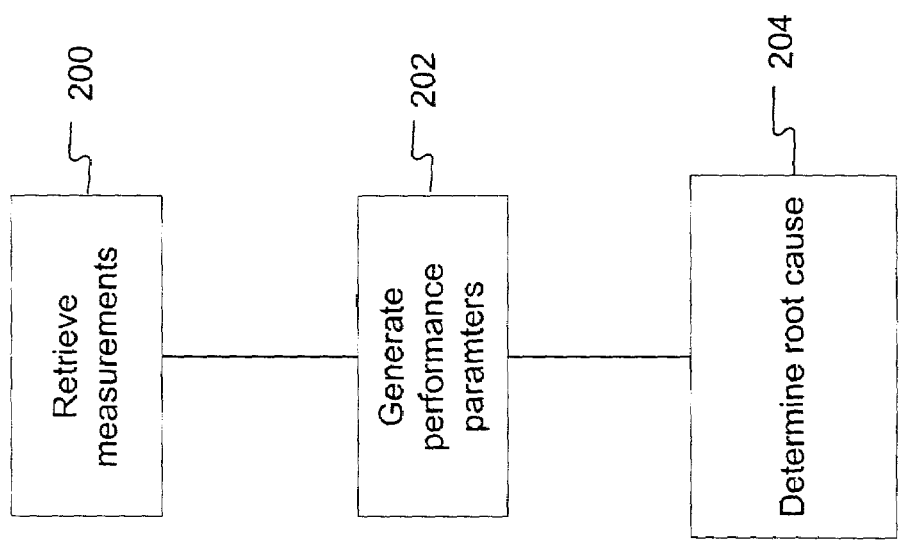
FIG. 2 illustrates exemplary steps performed by a server for analyzing performance of a network, in accordance with methods and apparatus consistent with the present invention.

FIG. 2 illustrates exemplary steps performed by monitoring server 118 for analyzing performance of network 100, in accordance with methods and apparatus consistent with the present invention. Monitoring server 118 may analyze the performance network 100 based on a request, such as from a user at user device 102. For example, a user at user device 102 may report slow response from network 100, or degraded voice quality related to voice-over-packet-over DSL service over network 100. Alternatively, monitoring server 118 may analyze the performance of network 100 at a predetermined interval, such as every 5 minutes.

Monitoring server 118 may receive one or more measurements to analyze the performance of network 100 (stage 200). The measurements may relate to various layers of communications transported across portions of network 100, such as access network 110, or access link 106. Communications transported across network 100 may comprise a physical layer, a data link layer, and a logical layer. The physical layer may relate to transmission of information over a physical link, such as equipment descriptions, wiring information, transmission information, and transmission media information, such as data rate capacity (or attainable bit rate) of access link 106 and service level agreement for access link 106.

The data link layer may relate to processes and mechanisms used to transmit information over a link between two devices, such as ATM virtual connection information for access network 110 and ATM statistics, including cell delay, cell delay variation, cell loss rate, etc.

The logical layer may relate to processes and mechanisms used to transmit information over networks, such as access network 110 and WAN 114, and routable protocols, such as IP. In addition, the logical layer may relate to end-to-end integrity of transmissions, session information between user device 102 and destination device 116, encoding transmissions over WAN 114, applications running on user device 102, and applications running on destination device 116.

Monitoring server 118 may initially receive measurements related to the logical layer of communications transported across network 100. For example, a user at user device 102 may initiate an application to run one or more IP protocol tests, such as a bandwidth test. The bandwidth test may comprise one or more IP packets with a given payload size of, for example, 256 kilobytes. The IP packets are time stamped and looped between user device 102 and gateway device 112. The application may then calculate an IP bandwidth by dividing the payload size by the time difference indicated by the time stamps. In addition, monitoring server 118 may receive other logical layer measurements, such as IP packet delay, IP jitter, and IP packet loss, based on information retrieved from database 120, or tests, such as a ping or traceroute, between user device 102, gateway device 112, and destination device 116.

Monitoring server 118 may also receive data link layer and physical layer measurements. For example, monitoring server 118 may use the simple network management protocol ("SNMP") to retrieve data link layer information from access network 110, access multiplexer 108, and gateway device 112. RFC-1157, J. Case et al., (1990), titled "A Simple Network Management Protocol (SNMP)," describes, inter alia, the SNMP protocol and is incorporated herein by reference in its entirety. Using SNMP, monitoring server 118 may retrieve data link layer measurements, such as virtual connection information including the VPI of a virtual connection, the VCI of the virtual connection, and traffic statistics, such as cell delay, cell delay variation, cell transfer rate, and cell loss rate. In addition to SNMP, monitoring server 118 may use ATM operations and maintenance ("OAM") cells, or proprietary management schemes from particular manufacturers to receive measurements from access network 110.

Monitoring server 118 may retrieve physical layer measurements relating to various links, such as access link 106 within network 100. Monitoring server 118 may use the SNMP protocol to retrieve physical layer measurements from either access multiplexer 108 or access device 104. For example, monitoring server 118 may send a command via the SNMP protocol to multiplexer 108 to initiate a metallic loop test on access link 106. Multiplexer 108 may then perform the metallic loop test by sending a variety of signals over a range of frequencies through access link 106. Based on the frequency response, access multiplexer 108 may then determine various physical layer parameters for access link 106, such as a data rate capacity (or attainable bit rate), a downstream data rate, an upstream data rate, a signal to noise ratio, an output power gauge, an impedance, and a capacitance.

Monitoring server 118 may also receive measurements based on information from database 120. For example, monitoring server 118 may query database 120 to receive information, such as equipment descriptions, equipment configurations, buffer sizes, wiring information, transmission information, and transmission media information for access link 106, and service level agreement information for access link 106. The service level agreement may indicate the nature of service provided over access link 106 and metrics used to measure the service, such as a promised data rate.

Monitoring server 118 may then generate one or more performance parameters based on which monitoring server 118 may analyze the performance of network 100 (stage 202). Monitoring server 118 may generate performance parameters based on one or more measurements from different layers of communications transported across network 100.

For example, monitoring server 118 may correlate the IP bandwidth test between access device 102 and gateway device 112 with the attainable bit rate measured from access link 106. Monitoring server 118 may then determine if the IP bandwidth test is above a threshold percentage of the attainable bit rate, such as 30% of the attainable bit rate. Monitoring server 118 may also determine if the attainable bit rate is above a threshold percentage of the service level agreement, such as 80% of the promised data rate.

As another example, for voice-over-packet-over-DSL communications, monitoring server 118 may correlate IP jitter with ATM cell transfer rate, attainable bit rate, buffer size, and an equipment configuration, such as echo cancellation. Monitoring server 118 may correlate other measurements to generate performance parameters.

Monitoring server 118 may then determine a root cause of a problem in network 100 based on the performance parameters (step 204). Monitoring server 118 may analyze for the following exemplary root causes: access link 106 too long; loss of synchronization signal on access link 106; excessive noise on access link 106; virtual connection mis-configured in access network 110; congestion at access multiplexer 108; congestion in access network 110; congestion at gateway device 112; congestion in WAN 114; congestion at user device 102; congestion at destination device 116; configuration problem at access device 104; IP parameters misconfigured at user device 102; configuration problem at access multiplexer 108; and a failure within network 100. Monitoring server 118 may analyze for other root causes in addition to those discussed above.

For example, if the IP bandwidth test is above 30% of the attainable bit rate for access link 106, then monitoring server 118 may consider this as normal performance for network 100. However, if the IP bandwidth test is below 30% of the attainable bit rate for access link 106, then monitoring server 118 may identify this as a performance issue and retrieve additional information to identify the root cause. Monitoring server 118 may retrieve SNMP protocol information from access multiplexer 108 and physical layer information from database 120. Monitoring server 118 may then verify the configuration of access device 104 and access multiplexer 108 based the retrieved information.

As another example, if the measured attainable bit rate of access link 106 is above 80% of the promised data rate in the service level agreement, then monitoring server 118 may consider this as normal performance for network 100. However, if the attainable bit rate is below 80%, then monitoring server 118 may identify this as a performance issue for a portion of network 100, such as access network 110. Monitoring server 118 may then receive SNMP protocol information from access network 110 to determine the location of a potential congestion in access network 110. Congestion within access network 110 may be indicated based on a variety of information, such as high cell delay, high cell delay variation, and high cell loss. Monitoring server 118 may also use other traffic statistics, such as IP packet loss at gateway device 112, to locate the congestion within access network 110.

As another example, for voice-over-packet-over DSL, if monitoring server 118 generates a performance parameter for IP jitter of 30 milliseconds, then monitoring server 118 may check for whether echo cancellation is configured in equipment in network 100, a buffer size of at least 50 milliseconds, an ATM cell transfer rate of at least 64 kilobits per second, and an attainable bit rate for access link 106 of approximately 1 megabit per second upstream, or 300 kilobits per second downstream. Monitoring server 118 may then receive SNMP protocol information, such as from access network 110, to determine a root cause for degradation in the voice-over-packet-over DSL communications over network 100.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method to determine performance of a network, the method comprising:

providing a database containing service level agreement information;

receiving a first measurement relating to a virtual connection in the network relating to a first layer of communications in the network;

receiving a second measurement relating to an attainable bit rate in a portion of the network relating to a second layer of communications in the network;

receiving at least one additional measurement including management information base parameters from one or more nodes in the network relating to a third layer of communications in the network;

generating a set of parameters for the network based on the first, second, and at least one additional measurements;

determining performance of the network based on the generated set of parameters; and adjusting the set of parameters to meet the service level agreement.

2. The method of claim 1, wherein receiving the first measurement further comprises:

receiving information relating to transport of internet protocol packets in the network.

3. The method of claim 1, wherein determining performance of the network based on the generated set of parameters comprises:

correlating the information relating to transport of internet protocol packets with the attainable bit rate in the portion of the network.

4. An apparatus for determining performance of a network comprising:

database containing service level agreement information;

means for receiving a first measurement comprises means for receiving information relating to a virtual connection in the network relating to a first layer of communications in a network;

means for receiving a second measurement comprising means for receiving information relating to an attainable bit rate in a portion of the network relating to a second layer of communications in the network;

means for receiving at least one additional measurement comprises means for receiving management information base parameters from one or more nodes in the network relating to a third layer of communications in the network:

means for generating a set of parameters for the network based on the first, second, and at least one additional measurements:

means for determining performance of the network based on the generated set of parameters; and means for adjusting the set of parameters to meet the service level agreement.

5. The apparatus of claim 4, wherein the means for receiving the first measurement further comprises:

means for receiving information relating to transport of internet protocol packets in the network.

6. The apparatus of claim 4, wherein the means for determining performance of the network based on the generated set of parameters comprises:

means for correlating the information relating to transport of internet protocol packets with the attainable bit rate in the portion of the network.

* * * * *